UNITED STATES PATENT OFFICE 2,530,489

INCENDIARY COMPOSITION

William F. Van Loenen, Los Altos, Calif., assignor, by mesne assignments, to Kaiser Aluminum & Chemical Corporation, a corporation of Delaware No Drawing. Application September 25, 1944, Serial No. 555,765

9 Claims. (Cl. 52—24)

The present invention relates to an incendiary composition and to a method of creating incendiary conditions including the step of promoting a reaction between the incendiary composition and an oxidizing liquid.

In my copending application Serial No. 492,989, filed July 1, 1943, now Patent No. 2,509,710, I have set forth the production of magnesium metal from magnesium oxide by carbothermic reduction according to the process disclosed in Patent No. 1,884,993 (Hansgirg). Therein a mixture of magnesium oxide and carbon is converted into magnesium vapor and carbon monoxide by the heat of an electric arc furnace. This gaseous mixture is discharged from the region of the arc at a high enough temperature (above 1800° C.) that reversal of the reaction does not occur, and is then suddenly cooled and diluted by injecting large volumes of a shock chilling agent, which may be hydrogen, natural gas, hydrocarbon vapor or even a spray of liquid hydrocarbon.

In one particular practice of the process natural gas is employed. The magnesium vapor is condensed to magnesium metal in the form of extremely fine dust. Some of the vapor recombines with carbon monoxide with the result that the solid material precipitated in the condensing chamber comprises a substantial proportion from 30 to 65% of magnesium dust with the remaining 70 to 35% comprising carbon, magnesium oxide and other impurities. A typical sample of a normal run shows 47% by weight of magnesium metal dust.

This condensate, i. e., the magnesium dust with admixed impurities, while it requires coalescing of the magnesium dust to produce compact metal, is, nevertheless, highly pyrophoric, and will combust spontaneously when exposed to the atmosphere. To diminish this tendency so that the material may be safely handled for sublimation into crystalline magnesium metal, it is now customary to wet the precipitate with a light hydrocarbon oil having a flash point above 100° F., with or without the addition of asphalt to produce a relatively stiff plastic mass which is termed herein as carbothermic magnesium paste. The asphalt is added when it is desired to make the mass somewhat cohesive, particularly where it is desired to tablet the material into compact pellets or briquettes. Where the shock chilling is produced by oil spray, the shock chilling oil wets the precipitate and inhibits ignition while forming carbothermic magnesium paste.

Experiments proved that this carbothermic magnesium paste, i. e. magnesium dust and impurities wet with oil and with or without asphalt or other binder is not spontaneously reactive with dry air. However, water vapor or spray will ignite the carbothermic magnesium paste and this paste-water combination provides an inexpensive incendiary.

The average analysis of the magnesium dust is:

|  | Per cent |
|---|---|
| Magnesium | 50 |
| Carbon | 19 |
| Inert (principally MgO) | 31 |

A small percentage of the magnesium (approximately 5%) exists as one or both of the carbides—$MgC_2$ and $Mg_2C_3$. There is generally a trace of sodium which is believed to be in elemental form and possibly minor traces of other carbides such as calcium, silicon and aluminum originating from the ash constituents from the metallurgical coke in the reduction furnace and/or from the minor ash constituent in the petroleum coke used for reduction. With the exception of occasional carryover of particles from the reduction furnace all of these materials have an ultimate particle size below the revolving power of optical microscopes. Electron microphotographs reveal agglomerates several microns in diameter and ultimate particles in the neighborhood of 0.1 micron.

The hydrocarbons which may be employed for wetting the magnesium dust may advantageously consist of 50% distillate and 50% asphalt designated as Orcutt-120. A typical analysis of a mixture of such hydrocarbons which has proved successful is as follows:

Distillate

| | |
|---|---|
| Gravity ° API at 60° F | 23 |
| Flash point Pensky-Marten closed cup__°F__ | 180 |
| Viscosity Saybolt seconds Universal at 100° F | 60 |

Orcutt-120 asphalt

| | |
|---|---|
| Gravity ° API at 60° F | 10.2 |
| Flash point Pensky-Marten closed cup__°F__ | 430 |
| Viscosity Saybolt seconds Furol at 210° F | 145 |

To produce a mixture of dust and hydrocarbons, safe for shipment and suitable for compounding incendiary fuels, the shock chilled dust is conveyed in a closed atmosphere under natural gas to pug mill type extrusion presses where it is thoroughly mixed with the desired hydrocarbons and extruded through a die plate into open drums. The limitations on this equipment are such that practical concentrations can be made between 55% and 70% solids, the balance hydrocarbons. For reasons of safety it is undesirable to include low flash hydrocarbons at this stage. Various mixtures of fuel oils, or asphalt cut-back with fuel oils, or kerosenes in a considerable range, are practical from a production standpoint. This magnesium material when thoroughly wetted with hydrocarbons is not easily ignited nor will it flash or explode. However, if allowed to air dry or come in contact with water, acid, or perspiration, it will sooner or later ignite when such liquid has cut through the protective layer of hydrocarbon so as to react with the finely divided magnesium.

The construction of well known incendiaries, particularly those of the known "stick" form, involves the use of cast solid magnesium metal which is difficult to ignite except by thermite or a similar igniting charge. Incendiaries and flares of magnesium powder have therefore been made by first producing magnesium in solid metal form and then sub-dividing it. By my method the raw powder coming from the shock chilling step of the carbothermic process may be directly substituted for the far more expensive method at present utilized. Also, the magnesium metal as employed in the carbothermic magnesium paste is of a state of subdivision far greater than that which it is practicable to produce by mechanical comminution.

According to my invention the magnesium powder even in the impure form as recovered from the vapor produced by carbothermic reduction, and with or without other materials, may be directly applied to incendiary use without going through the stage of first producing the coalesced or solid metal. A great advantage of using such a finely divided metal is that the desired ignition may be secured from mere contact with such simple media as air and water. Any substance which gives up oxygen freely enough to produce ignition, i. e., rapid combustion, may be used.

The finely divided magnesium produced in the carbothermic process has a particle size of substantially less than one micron, and as heretofore stated is capable of spontaneous combustion with the atmosphere unless wetted down with a material such as hydrocarbon oil. It is obvious that a particle size on the order of that mentioned cannot be achieved on a commercial scale by use of mechanical means. The fine particles, because of their pyrophoric qualities, would present a considerable fire hazard if mechanically produced, and the high cost and complicated equipment necessary to mechanically produce such particles in an inert atmosphere would be impractical. Thus additional advantages of this invention are that it utilizes an incendiary material of finely divided magnesium of a particle size never before attainable on a commercial scale, and yet such finely divided magnesium is capable of rapid and economic production, and can be safely handled.

The carbothermic magnesium paste may be used as is, as a paste, or it may consist of compacted or tableted pellets or briquettes. Magnesium and/or aluminum in the form of solid metal including alloys thereof either as a part or all of the container, or an admix in the form of borings, turnings, screenings, or pieces of scrap metal, may be used in conjunction with the carbothermic magnesium paste and may partake of the incendiary reaction, after the same is initiated.

It is to be understood that after the carbothermic magnesium paste is once ignited, it will continue to burn by reaction with the oxygen and/or nitrogen of the air, and tends by the heat and flame produced to ignite adjacent combustibles. Water applied to extinguish it is of no use as it reacts readily with the magnesium, accelerating combustion. Such common extinguishers as carbon dioxide actually accelerate the combustion.

Additional reagents which tend to sustain combustion of the magnesium powder, such as ferric oxide, barium oxide and other similar metal oxides, potassium chlorate, sodium nitrate, and other similar metallic salts containing combined oxygen, sulfur, gasoline or carbon, and mixtures thereof, may be added to the carbothermic magnesium paste, and after ignition is instituted as by the liquid oxidizing agent, the further combustion may be sustained or aided by such reagents. Where a liquid, such as water, is employed to produce ignition, the resulting gas, such as hydrogen, is combustible and tends to spread the fire. Similarly, liquids which by deoxidation by the finely divided magnesium produce combustible gases, tend also to spread the fire by producing a flame reaching into adjacent space for oxygen to support its combustion.

While plain water is the simplest liquid oxidizing agent, there may be situations or conditions of use calling for the addition of antifreeze agents or of liquids which will withstand low temperatures without solidification. Thus alcohols, such as methanol, aldehydes and organic acids may be employed. Also inorganic compounds such as chlorates, permanganates, particularly of the alkali metals, may be dissolved in the liquid or associated therewith. Wetting agents to accelerate the wetting of the incendiary material with the liquid may be used.

If it is desired to ignite the magnesium powder in a body of water, or under similar conditions, particularly where it is desired to ignite an oil slick on a body of water, it is advantageous to add an agent which will cause heat and/or gas generation, such as quicklime and/or carbides. The addition of carbides to the finely divided magnesium powder is particularly advantageous due to their gas generating properties, because the pressure generated causes the casing containing the incendiary material to burst more rapidly with consequent dispersion of the incendiary charge over the adjacent area in a very effective manner.

An additional feature of the invention is that the finely divided magnesium dust is colloidal in nature and can be readily incorporated to form fortified hydrocarbon gel type incendiaries with good results in sharp contrast to mechanically comminuted magnesium which does not give good results. In the use of carbothermic magnesium paste with the gels or alone there is an additional advantage that the reaction between the colloidal magnesium particles and the oxidizing liquid takes place progressively throughout the mass to liberate great quantities of heat to destructively distill the hydrocarbons in admixture therewith and give off large quantities of inflammable gases with sufficient violence to induce air circulation and mixing to thereby burn the gases substantially to completion. It is to be noted that the use of heavy hydrocarbons is advantageous in that they have a higher heat of combustion on a volume basis than light hydrocarbons, which is important in many instances, e. g. the storage capacity of an airplane. Another point of importance is that the generation of gases within the asphaltic mass of the incendiary yields a swelling ash which is useful.

The present invention is a continuation-in-part of my application Serial No. 492,989, filed July 1, 1943, now Patent No. 2,509,710.

The primary object of the invention is to form an incendiary composition having magnesium and a metallic carbide or phosphide as the active agents, and further contemplating the addition of a solid-oxidizing agent thereto.

An object of the invention is to provide an incendiary composition comprising carbothermic magnesium paste, as obtained in the reduction of magnesia by carbon and treated by the process hereinbefore described, in combination with a material which generates combustible gases, which ignites in the presence of water or other oxidizing liquids.

Another object is to provide an incendiary composition which is particularly adaptable for igniting oil slicks, or the like, which have been set free upon harbors, lakes or the like, or to ignite wharfs, sheds, pilings or any structure near water which is available for the prime reaction.

In carrying out the invention, the magnesium dust and impurities, are mixed with a solution of about 10 parts asphalt dissolved in 90 parts of a liquid hydrocarbon, such as Stoddard solvent, or any other hydrocarbon oil. The magnesium dust is present in amount sufficient to produce a mixture having about 65%–70% solids content. The solvent is then distilled off from this mixture to give a final mixture having about 85%–95% solids content. If desired the carbothermic magnesium paste is placed in an evaporator until the volatile constituents have been suitably reduced. The incendiary material is left in comparatively dry lumps. However, the finely divided magnesium powder is protected from oxidation by the residual coating of asphalt and some remaining solvent.

The carbothermic magnesium paste material is then sized preparatory to admixture with the combustible gas producing agent. The particle size of the paste material is usually in the range which will pass a ½" mesh screen and includes fines as well as coarse particles.

To this mixture is added a quantity of a material which generates combustible gases when combined with water. Calcium carbide is preferred, though any metallic carbide or phosphide, including those of the alkali earths, may be employed.

The calcium carbide, i. e., the gas generating agent is present in an amount varying from a trace of the carbide to a considerable percentage by weight, depending upon the results desired or the conditions under which the incendiary is to be ignited. For example, incendiary compositions have been prepared wherein the carbide content of the gas generating agent varies between 0.05% by weight to 25%, or more, by weight. Compositions having a high percentage by weight of gas generating agent, say 25%, are particularly useful for igniting oil slicks.

The gas generating agent may be mixed with the carbothermic magnesium paste. Or as in case of a bomb, it may be placed in a separate compartment separated from the paste by a wall which ruptures upon bomb impact to initiate a reaction. For example, when water and calcium carbide are brought together, a reaction occurs liberating acetylene and generating much heat.

The acetylene is unstable at normal temperatures at pressures over two atmospheres. When its limit of stability is reached it decomposes with explosive violence thus liberating carbon and hydrogen.

It is well known that the speed of a chemical reaction is accelerated with an increase of temperature. The heat causes reduction of the viscosity of the protective oil film around the magnesium particles, simultaneously increasing the chemical activity of the magnesium powder. The result is instantaneous ignition of the charge.

In my copending application, Serial No. 492,989, filed July 1, 1943, I have described a bomb of the bursting type. The hydrocarbon oil modified magnesium dust, or oil-asphalt modified magnesium dust in combination with an agent which generates combustible gases when in contact with an oxidizing liquid, such as water, may be employed in any suitable bomb or container. The only requirement is that means be supplied to bring about the above described reaction under conditions providing an incendiary feature.

For example in the bursting bomb type of container, the ignition is so sudden that it is impossible to determine whether the initial ignition is instituted by the decomposition of the combustible gases or by the spontaneous combustion of the magnesium powder with subsequent ignition of the combustible gases. Due to heat generated in, for example, the carbide-water reaction the water may first react with the magnesium powder liberating hydrogen gas which is also highly combustible. In the event that the bomb casing bursts from internal pressure before the point of decomposition of the acetylene gas, ignition takes place instantaneously but with less violence than if higher pressure is obtained.

In carrying out the invention, it has been found advantageous for some uses to employ a solid oxidizing agent in combination with the magnesium paste and gas generating agent. For example 30 lbs. of carbothermic magnesium paste are mixed with 4.5 lbs. of calcium carbide and 4.5 lbs. of $Fe_2O_3$. These ingredients are mixed in a covered receptacle. The mixture is disposed in two pound portions into paper receptacles and a hole is punched in the top and bottom of each. In operation, this incendiary has a tendency to sleep for four or five minutes after being thrown into water before breaking out into flame.

Any suitable solid oxidizing agent may be employed in the paste-gas generating agent mixture to form an incendiary composition.

The concept of this invention embraces the feature of providing an incendiary composition comprising as one ingredient a product of the carbothermic process disclosed in the Hansgirg Patent No. 1,884,993. The said ingredient is suitably modified as by oil or by an oil-asphalt mixture to decrease its reactivity in air. The modified product of the Hansgirg process, known as carbothermic magnesium paste, is combined with an agent capable of generating combustible gases, to give an incendiary which requires water, or the like, to promote ignition and reaction.

A further concept of the invention includes the feature of a method of creating incendiary conditions comprising the step of bringing water, or other liquid oxidizing agents, into reaction with the mixture comprising carbothermic magnesium paste and an agent capable of generating combustible gases; and more particularly to a method of igniting oil slicks by employing said composition.

It is to be understood that the term "incendiary" as used herein is not intended to be limited to incendiaries as applied to bombs or the like, but instead is intended to include any application wherein such material is useful, such as fireworks, flares, signals, etc.

The incendiary of the invention is ideal in many applications because it vastly increases the chances of self-sustaining combustion.

I claim:

1. An incendiary composition comprising the magnesium dust formed in the thermal reduction of magnesia by carbon, said dust bearing a coating comprising a mixture of asphalt and liquid hydrocarbon to reduce its activity in air, and at least one substance of the class consisting of the metallic carbides and the metallic phosphides.

2. An incendiary composition comprising the magnesium dust formed in the thermal reduction of magnesia by carbon, said dust bearing a coating comprising a mixture of hydrocarbon oil and asphalt to reduce its activity in air, and a metallic carbide.

3. An incendiary composition comprising the magnesium dust formed in the thermal reduction of magnesia by carbon, said dust being modified by coating with a mixture of asphalt and liquid hydrocarbon to reduce its activity in air, and calcium carbide.

4. An incendiary composition comprising the magnesium dust formed in the thermal reduction of magnesia by carbon, said dust bearing a coating comprising a mixture of asphalt and liquid hydrocarbon to reduce its activity in air, and calcium phosphide.

5. An incendiary composition comprising the crude magnesium dust formed in the thermal reduction of magnesia by carbon, said dust being finely divided and bearing a coating comprising a mixture of asphalt and liquid hydrocarbon to reduce its activity in air, in combination with calcium carbide present in an amount ranging approximately 0.05%–25% by weight.

6. An incendiary composition comprising pyrophoric magnesium dust in combination with at least one substance of the class consisting of the metallic carbides and the metallic phosphides, said magnesium bearing a protective coating of a mixture comprising asphalt and liquid hydrocarbon.

7. An incendiary composition comprising finely divided magnesium in combination with calcium carbide, said magnesium bearing a protective coating of a mixture comprising asphalt and liquid hydrocarbon.

8. An incendiary composition adapted to be ignited by water comprising pyrophoric magnesium dust obtained in the thermal reduction of magnesia by carbon, said dust having an ultimate particle size of less than one micron diameter and bearing a coating comprising a solution of asphalt in liquid hydrocarbon to reduce its activity in air, calcium carbide and a solid oxidizing agent.

9. An incendiary composition comprising pyrophoric, finely divided magnesium, bearing a protective coating comprising a mixture of asphalt and liquid hydrocarbon, in combination with at least one substance of the group consisting of the metallic carbides and the metallic phosphides, and a solid oxidizing agent.

WILLIAM F. VAN LOENEN.

REFERENCES CITED

The following references are of record in the file of this patent:

UNITED STATES PATENTS

| Number | Name | Date |
|---|---|---|
| 407,351 | Hemsley | July 23, 1890 |
| 841,172 | Nienstadt | Jan. 15, 1907 |
| 1,308,463 | Webb | July 1, 1919 |
| 1,399,953 | Fulton | Dec. 13, 1921 |
| 1,419,295 | Nichols | June 13, 1922 |
| 2,033,966 | Wiley | Mar. 17, 1936 |
| 2,149,314 | Schladt | Mar. 7, 1939 |
| 2,242,721 | Hanawalt | May 20, 1941 |
| 2,328,202 | Doerner | Aug. 31, 1943 |

FOREIGN PATENTS

| Number | Country | Date |
|---|---|---|
| 22,030 | Great Britain | of 1910 |
| 124,796 | Great Britain | Apr. 10, 1919 |
| 492,888 | Great Britain | Sept. 28, 1938 |
| 559,348 | Great Britain | Feb. 15, 1944 |